United States Patent Office 2,790,403
Patented Apr. 30, 1957

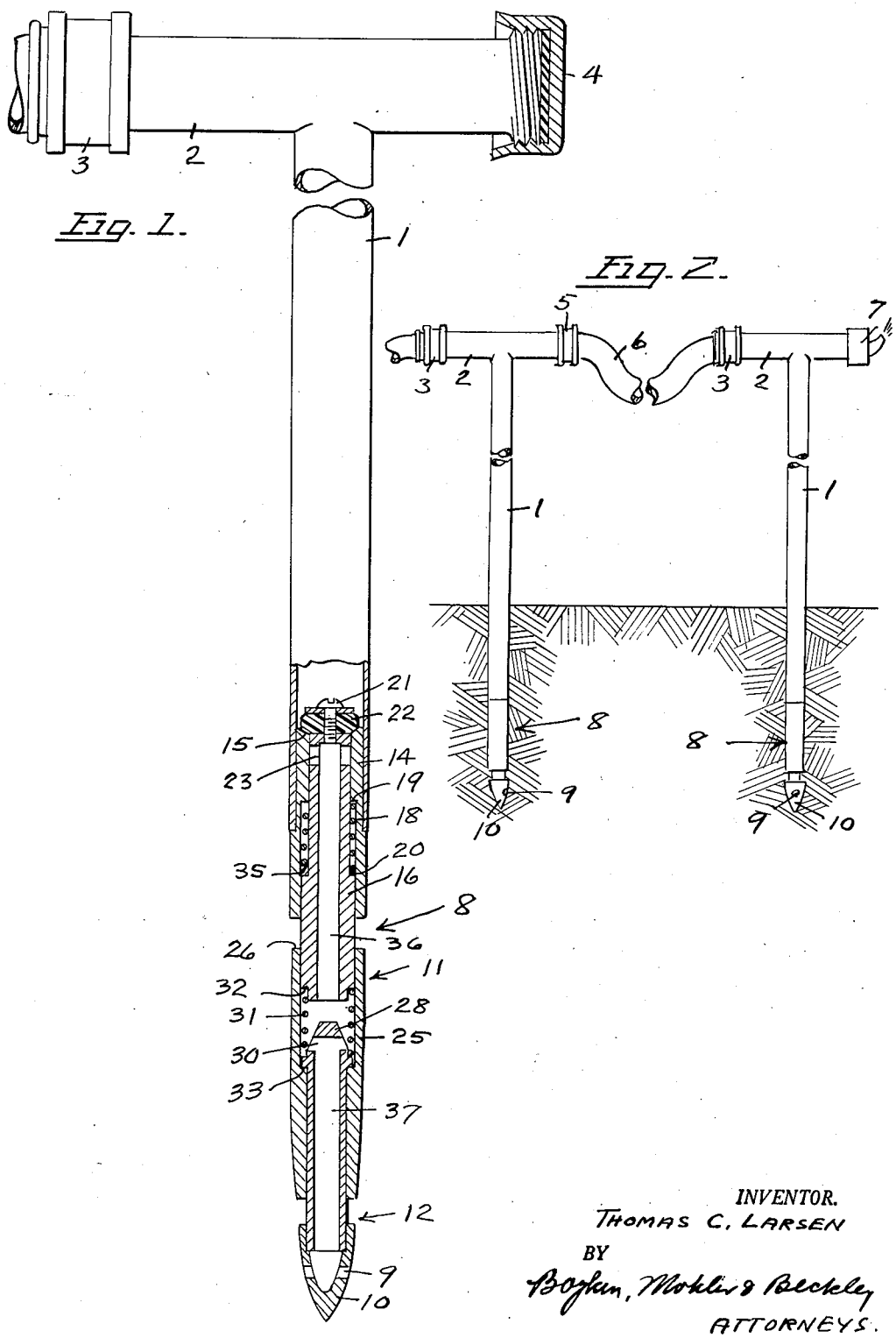

2,790,403
GROUND IRRIGATOR
Thomas C. Larsen, Albany, Calif.

Application July 27, 1953, Serial No. 370,302

2 Claims. (Cl. 111—7.1)

This invention relates to a ground irrigator and has for its main object the provision of a tubular device adapted to be thrust into the ground for conducting water to below the ground surface for discharge into the ground and which device is provided with means for automatically closing said device to the flow of water into said ground when the ground is sufficiently irrigated.

Another object of the invention is the provision of a tubular device adapted to be thrust into the ground for conducting water to below the surface of the ground for discharge into the ground and which device is provided with means actuated by the force required to thrust the same into the ground for closing the device to flow of water therethrough during the operation of thrusting it into the ground but which means will automatically open to permit said flow as soon as said force ceases and said means includes a structure that will automatically close the device to flow of water therethrough as soon as the soil is sufficiently irrigated.

In explanation of the above, heretofore tubing or pipe has been employed to conduct water into the ground for discharge at points close to the roots of the plant life being irrigated. However, the flow of water through such devices and into the ground has usually been controlled by a manually actuatable valve. Other controls have involved the use of timers that permit the water to flow for a predetermined time.

With the present invention, the wetness of the soil determines the time at which the control mechanism is actuated for closing the device to flow of water therethrough and into the ground.

Other objects and advantages will appear in the description and in the drawings.

In the drawings Fig. 1 is a side elevational view of the present device substantially actual size with the lower end being in cross section to show the working parts.

Fig. 2 is a reduced size, side elevational view showing a combination of devices such as shown in Fig. 1 in which several of such devices and a sprinkler are coupled together, the soil in which the devices are positioned being sectioned.

In detail, the invention illustrated comprises a pipe or tube 1 having a tubular cross head 2 rigid therewith at one end of said pipe. This cross head and said one end of the pipe communicate at their juncture, and an interiorly threaded hose coupling 3 is provided at the inlet end of the cross head. The opposite end is exteriorly threaded for a closure cap 4, or for the interiorly threaded coupling 5 (Fig. 2) of a hose 6 or for a conventional sprinkler 7.

Rigidly secured within the end of pipe 1 that is opposite said cross head is one end of a member generally designated 8.

This member 8 has a passageway therethrough leading to openings 9 that are in the outer pointed end 10 of said member, said end being pointed to facilitate thrusting the pipe into the ground.

The member 8, as shown, is in two tubular sections, one being called the inner section and generally designated 11 since said section is adjacent to the pipe, and the outer section being designated 12, as it is outermost relative to said pipe.

A sleeve 14 is press fitted into the outer end of pipe 1 thus providing an annular shoulder 15 within said pipe, and which shoulder, as will appear later, provides a seat for a valve element. For practical purposes, the sleeve 14 may be considered as being integral with the pipe 1, although it is first assembled with the inner section 11 before its securement to the pipe.

A tubular part 16 of the said inner section 11 is reciprocable axially of pipe 9 within the sleeve 14 and this part is a relatively close fit within said sleeve except for portions of said sleeve and said part that are respectively of enlarged restricted diameters to provide a space for an expansion helical spring 18 between them. One end of spring 18 reacts against the shoulder 19 that defines the end of the enlarged inside diameter portion of sleeve 14 and the other end reacts against the shoulder 20 that defines the end of the restricted outside diameter portion of the tubular part 16.

The inner end of part 16 within sleeve 14 and pipe 1 is closed and is formed with a central threaded recess for the screw 21 that secures a valve element 22 to said part 16. This valve element is within pipe 1 beyond the terminating end of sleeve 14 and is normally held on seat 15 by spring 18.

Adjacent to said valve element 22, the walls of tubular part 16 are formed with coaxial openings 23. When the valve element 22 is seated on seat 15 it will be seen that no water can flow through the openings 23 and part 16 to the openings 9 in the pointed outer end 10.

An axial extension 25 of part 16 may be in the form of a tubular element in one end of which one end of the part 16 is press fitted so that extension 25 and said part are rigidly held together. A shoulder 26 is formed by the end of said tubular extension 25 that is adjacent to the outer end of sleeve 14, and said shoulder 26 and end of sleeve 14 are spaced apart a sufficient distance to permit the part 16 to be forced into the pipe 1 far enough so that openings 23 will be fully uncovered to permit flow of water in pipe 1 therethrough and through the part 16 and extension 25.

From the above, it will be seen that part 16 and extension 25 form the main parts of the inner section 11.

The extension 25 projects axially outwardly of the part 16 a substantial distance. Reciprocable within said extension is the outer section 12 that carries the pointed end 10.

At the end of section 12 that is within section 11 is a valve device 28 which is merely in the form of a tapered closure for the inner end of said section, and directly below said device are coaxial openings 30. A spring 31 reacting between said inner section 12 and an axially facing shoulder 32 within section 11 and formed by the end of part 16, yieldably engages the section 12 in direction outwardly of the section 11 so that annular shoulder 33 on said section 12 and just below openings 30 will engage a corresponding oppositely directed shoulder formed within section 11 to prevent section 12 from being forced out of section 11.

Any suitable packing ring 35 may be around the part 16 and against shoulder 20 to prevent leakage of water at the gap between sleeve 14 and extension 25.

Assuming the inlet at coupling 3 is connected with a supply of water under pressure, it will be seen that no water will be ejected from openings 9 because valve element 22 is seated against the shoulder provided by the end of sleeve 14.

In operation, with the water under pressure in pipe 1, the operator will first engage the ground with the pointed end 10 of the device and the outer section will move against the resistance of spring 31 to a position in which the valve device 28 closes the end of bore 36 in the part 16 so that any water admitted into said bore will not pass therefrom into the bore 37 of the outer section 12.

Very little resistance is provided by spring 31. In fact, in normal use, the pointed end 10 requires more force to cause it to enter the ground than is required to compress the spring 31.

In thrusting the pointed end 10 into the ground the force that is employed resists the pressure of water against valve 28 tending to move said valve off its seat and away from the outer end of bore 35.

As soon as the thrusting force stops, the water pressure is adequate to cause sufficient relative movement between valve 28 and its seat to move valve 28 off its seat and to open the passageway 37 to flow of water to openings 9 and into the ground. Since the water pressure within the device is substantially balanced at opposite ends of the tubular part 16 upon valve 22 being opened, and which valve is opened when the device is pushed into the ground, the force of spring 18 is inadequate to overcome the resistance between the soil and pipe 1 and sections 11, 12, to cause sufficient relative movement between tube 16 and pipe 1 to close valve 23 until almost all of said resistance is gone. This latter condition occurs only when the soil is relatively well soaked around the pipe 1 and sections 11, 12.

In actual practice it has been found that when the soil is so soaked that the valve 22 is closed, the watering for the particular zone in which the irrigating device is positioned is adequate. In clay soil, the time for closing valve 22 is substantially longer than in soil where moisture is more rapidly absorbed, hence the result is the same even though a longer time is required in one instance than in the other.

The employment of an outer end section 12 that will close the passageway therein to flow of water therethrough is not absolutely necessary for the watering of the soil, but it does prevent the operator from being sprayed with water before the point of the irrigator is in the ground. In many instances the surface of the ground is hard and in the absence of some provision to close the flow of water until the discharge openings are within the ground, the water would be ejected from openings 9 as soon as valve 22 was opened. By the present arrangement, until the pressure by the operator in forcing the irrigator into the ground is relieved, no water can be ejected from openings 9.

In Fig. 2, it is seen that a plurality of irrigating devices can be connected in series by hose lengths or other suitable conduits, such as indicated by hose 6. These will automatically be opened to flow of water into the ground upon their being inserted into the ground, and not before, and they will automatically close when the soil around each one is sufficiently soaked.

On a single irrigator, or on the end irrigator of a plurality of series connected irrigators, a sprinkler 7 may be attached, and such sprinkler will function during irrigation of the soil and as long as water under pressure is in the pressure line leading to the irrigator that has the sprinkler thereon. Hence the present device is adapted to be simultaneously used as an overhead sprinkler and as an underground irrigator, and the portion employed for the underground work will function as a support for the sprinkler.

In describing the present invention, it is to be understood that the claims are intended to cover such changes and modifications of the example herein disclosed for purposes of disclosure as do not constitute departures from the spirit and scope of the invention.

I claim:

1. An irrigator comprising a pipe having an inlet at one end for water and a ground engaging member coaxial therewith at the opposite end provided with a point to facilitate its entering the ground and formed with a passageway and with a discharge opening communicating therewith for discharge of said water, a valve element carried by said member positioned within said pipe movable axially of said pipe in one direction for closing said passageway to flow of water to said opening and movable in the opposite direction for opening said passageway to said flow, said member having a portion telescopically extending into said pipe and supported within the latter for reciprocable movement axially of said pipe and said element being connected with said portion for movement therewith for effecting said closing and opening of said passageway to said flow, said opening being relatively close to said pointed end and a spring engaging said portion to yieldably urge the latter together with said element in said one direction, a stop carried by said pipe engageable with said element for limiting movement of the latter and said movement in said one direction, said member including an outer tubular section having said opening and on which section said point is positioned, and further including an inner section that includes the said portion that is slidable within said pipe and that carries said valve element, said outer section being coaxial with said inner section and having a part thereof extending telescopically within said inner section for reciprocable movement therein axially thereof and a valve device on said part within said inner section for closing said inner section to flow of water therethrough to said outer section upon movement of said outer section a predetermined distance into said inner section and toward said pipe, a spring engaging said outer section yieldably urging said section and said valve device in a direction axially outwardly of said inner section and to a position in which said valve device opens said inner section for passing water into and through said outer section to said opening, said one direction in which said valve element is movable for closing said passageway to said flow being in a direction axially outwardly of said opposite end of said pipe.

2. An irrigator comprising a pipe having an inlet at one end of said pipe and a ground engaging member at the opposite end of said pipe, said opposite end being formed with an opening for discharge of water therefrom, said member including a tubular extension telescopically extending into said pipe with said extension reciprocable axially of said pipe, and valve means within said pipe actuated by movement of said extension in a direction outwardly of said pipe relative to said one end thereof for closing said pipe to flow of water to said opening, a first spring yieldably urging said extension in said direction outwardly of said pipe relative to said one end thereof, and said valve means being actuated by movement of said extension inwardly into said pipe toward said one end thereof for opening the pipe to flow of water to said opening the portion of said member at its outermost end relative to said one end of said pipe having said opening formed therein and said portion being pointed to facilitate its insertion into the ground, said portion being supported by said extension for reciprocable movement axially of said pipe, valve means carried by said portion actuated for movement therewith to a position opening said tubular extension for flow of water therefrom to said opening when said portion is at the farthest end of its movement in a direction outwardly of said pipe relative to said one end thereof and closing said tubular extension to flow of water to said opening when said valve means and said portion are at the end of their movement in direction toward said one end of said pipe, a second spring of lighter tension than said first spring in engagement with said portion for yieldably urging it to said farthest end of its movement, and means engaged by said portion for limiting its outward movement relative to said one end of said pipe.

(References on following page)

References Cited in the file of this patent

UNITED STATES PATENTS

| | | |
|---|---|---|
| 445,510 | Black | Jan. 27, 1891 |
| 1,110,182 | Blandin et al. | Sept. 8, 1914 |
| 1,868,235 | Jaden | July 19, 1932 |

FOREIGN PATENTS

| | | |
|---|---|---|
| 8,403/27 | Australia | July 20, 1927 |
| 104,953 | Switzerland | June 2, 1924 |

OTHER REFERENCES

Popular Science, pg. 22, September 1939.